No. 770,256.
PATENTED SEPT. 20, 1904.
E. W. BLAKE.
BELT FASTENER.
APPLICATION FILED JAN. 12, 1903.
NO MODEL.
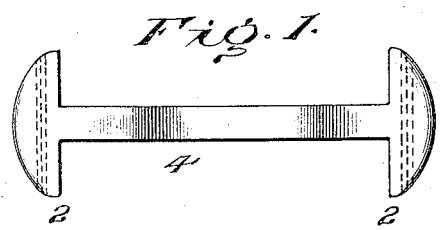
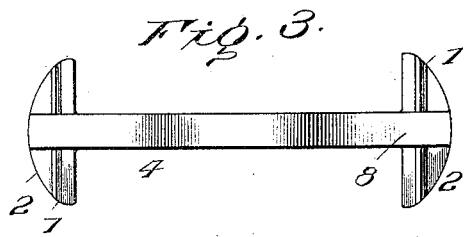
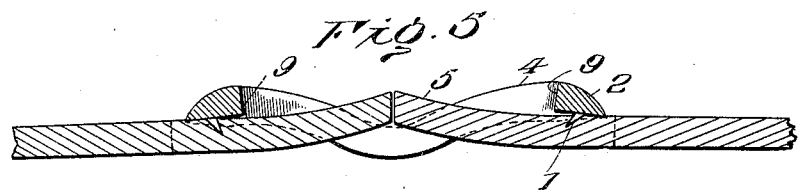
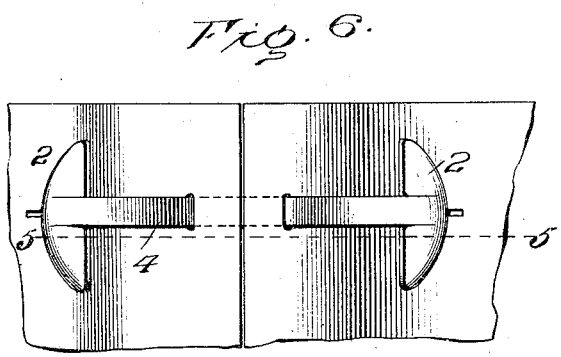
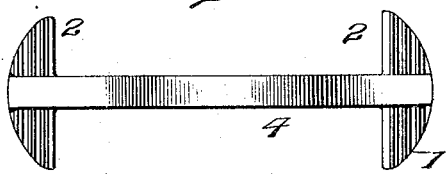
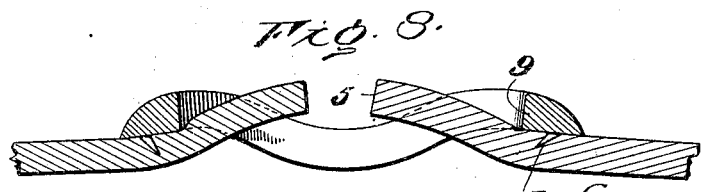
Inventor
Edgar W. Blake No. 770,256.

Patented September 20, 1904.

UNITED STATES PATENT OFFICE.

EDGAR W. BLAKE, OF PEPPERELL, MASSACHUSETTS.

BELT-FASTENER.

SPECIFICATION forming part of Letters Patent No. 770,256, dated September 20, 1904.

Application filed January 12, 1903. Serial No. 138,761. (No model.)

*To all whom it may concern:*

Be it known that I, EDGAR W. BLAKE, of Pepperell, in the county of Middlesex and Commonwealth of Massachusetts, have invented a new and useful Improvement in Belt-Fasteners, which is fully set forth in the following specification.

This invention relates to an improvement in belt-fasteners of the type described and shown in Patent No. 282,258, dated July 31, 1883, for a new and useful improvement in belt-fasteners upon the invention of Henry Blake. The belt-fastener there shown is composed of a curved bar or shank having T-heads at its ends, which engage the meeting ends of belts and connect the same. The meeting ends of the belt are brought together back to back. The fastener is inserted through a longitudinal slit in each end and then turned so as to bring the heads at right angles to the slit. A series of such belt-fasteners is generally used to connect the meeting ends of belts. All this has long been well known. The greatest strain upon the belt is at the bearing ends of the slits, upon which the belt-fasteners pull when the belt is in use.

One of the objects of my present invention is to relieve this strain upon the bearing ends of the slits. This I accomplish by providing the under faces of the heads in contact with the surface of the belt with means for engaging the belt and also by giving the inner faces of the heads such a contour that they will coöperate to engage the surface of the belt on each side of the slit through which the shank of the fastener passes to relieve the strain at the bearing end of the slit.

Other features of my improvement will be described, illustrated, and pointed out in the claims.

In the accompanying drawings, Figures 1 and 2 illustrate a top plan and side view showing my improvement as applied to an old belt-fastener. Fig. 3 is a bottom view of a fastener, showing additional features. Fig. 4 is a side view of Fig. 3. Fig. 5 is a longitudinal vertical section of the fastener as applied to a belt, taken on the line 5 5 of Fig. 6. Fig. 6 is a plan view of the fastener as applied when holding the ends of a belt together. Fig. 7 is a bottom view showing the under side of the head roughened by a plurality of ridges. Fig. 8 is a similar view to that of Fig. 5, but shows the belt after it has been put under tension.

In Figs. 1 and 2 I have shown a ridge 1 applied to the under side of the head of the old form of belt-fastener shown in my United States Patent No. 282,258. This ridge runs at right angles to the length of the fastener and is inclined in such a manner as to engage and assist in holding the ends of the belt when in position. The peculiar function of this ridge is to embed itself into the belt by reason of its sharp edge without materially impairing the strength of the belt, and thereby help to take up and distribute the strain at the bearing ends of the slits in the belt. This ridge preferably should have a somewhat sharp edge and should run across the heads 2 of the fastener at right angles to the shank 4 and slightly beyond the points of junction of the shank and head. This is clearly shown in the illustration, Figs. 1 and 2. In Figs. 3 and 4 I have shown the under surface of the head 2 similarly provided with a ridge; but in this case the ridge is interrupted by the strengthening-rib 8, described in detail below. In order to further reinforce the means for engaging the belt and relieve and distribute the strain at the bearing ends of the slits, I have illustrated in Figs. 3 and 4 means for effecting this result. In Fig. 4 the inner faces 3 3 of the heads, if extended downward or toward a point below the convex or under surface of the fastener, would meet. In like manner the under faces 7 7 of the heads 2 2, if extended upward or toward a point above the concave side, would meet on the upper side of the fastener. I have found that by giving these faces this inclination I can still further distribute the strain and assist the ridges 1 in performing their function. This will be evident by reference to Fig. 4. The face 3 and under surface 7 of the head 2 form at their intersection a sharp edge 9, which takes hold of the belt on each side of the slit when the fastener is in position, as shown in Figs. 5 and 6. When the belt is placed under tension, the slotted ends of the belt tend to slide up the back of the fastener, bending the ends 5 of the belt over the edge 9, thus assisting the ridge 1 in gripping the surface of the belt and preventing the shank from cutting into the belt at the end of the slit. To better conform the under surface of the head to the belt, the under edges of the inner faces have been sometimes cut away, thereby weakening the junction of the head and shank. To overcome this, the fastener may be made stronger by allowing those portions of the heads which are practically continuations of the shank to remain undiminished in size, thus forming, as it were, a strengthening-rib 8 on each head at right angles to rib 1. These ribs may be hardened or thickened by swaging, thus strengthening the points of union between the heads and shank. Such a rib may be of advantage even when the head is not shaped exactly as shown. Whether the heads be thus thinned or not the fasteners may be made thicker at or near the points where the heads and shank unite.

In Figs. 5 and 6 I have shown the fastener in position threaded through the ends of a belt. The fastener is that illustrated in Figs. 3 and 4. In operation when the belt is put under a strain the ends 5 of the belt tend to slide up the inclined portion of the shank 4, whereupon the ridge 1 and edge 9 engage the surface of the belt on both sides of the slit, thereby taking up and distributing a substantial part of the strain on the slit in the belt. This is illustrated in Fig. 8, where the ends 5 of the belt are shown bent around and engaging the edge 9 of the fastener-head, thereby coöperating with the ridge 1 in relieving the strain on the belt at the end of the slit.

The belt-fasteners herein described can be made by first cutting them out from a metal sheet, then shaping them in dies into approximately their final shape, and then swaging them.

I do not confine myself to the exact form of ridge herein described. One or more ridges of any suitable shape and properly located on the heads or a roughening of the under sides of the heads of the belt-fastener sufficient to engage with and grip the material of the belt to such an extent as to take up a substantial part of the strain will accomplish the same class of result.

While the foregoing improvements are especially adapted to use in connection with a belt-fastener having a curved shank, they are not necessarily confined thereto.

What I claim is—

1. A belt-fastener, consisting of a shank, a T-head on each end of said shank, means on the under surface of the head for engaging the surface of a belt, said head being provided with a strengthening-rib extending centrally across the flat face of the head and formed by a continuation of the shank.

2. A belt-fastener, consisting of a shank, a T-head on each end of the shank, a projecting sharpened edge on the under surface of the head for gripping the surface of the belt, the inner faces of said heads being in planes converging toward a point on the side of the head carrying the ridges, said head being provided with a strengthening-rib extending centrally across the flat face of the head and formed by a continuation of the shank.

3. A belt-fastener consisting of a shank, a T-head on each end of the shank, one or more ridges on the under surface of the head running substantially at right angles to the shank for engaging the surface of a belt, said head being provided with a strengthening-rib extending centrally across the flat face of the head and formed by a continuation of the shank.

4. A belt-fastener, consisting of a shank, a T-head on each end of said shank, one or more ridges on the under surface of the head, the inner faces of said heads being in planes converging toward a point on the side of the head carrying the ridge or ridges, and a strengthening-rib extending centrally across the flat face of the head and formed by a continuation of the shank.

5. A belt-fastener consisting of a shank, a T-head on each end of the shank, the inner and opposing faces of the heads being in planes converging toward a point on the under side of the fastener, the under faces of the head being in planes converging toward a point on the upper side of said fastener, said inner and under face of each head intersecting to form a gripping edge, one or more ridges on the under surface of each head, and a strengthening-rib extending centrally across the flat face of the head and formed by a continuation of the shank.

In testimony whereof I have signed this specification in the presence of two subscribing witnesses.

EDGAR W. BLAKE.

Witnesses:
R. A. PIPER,
RICHARD F. JONES.